United States Patent
Craddock et al.

(10) Patent No.: US 9,402,381 B1
(45) Date of Patent: Aug. 2, 2016

(54) APPARATUS FOR SECURING FISHING POLE

(71) Applicants: Ted Craddock, Antioch, TN (US);
Robert Wessel, Golconda, IL (US)

(72) Inventors: Ted Craddock, Antioch, TN (US);
Robert Wessel, Golconda, IL (US)

(*) Notice: Subject to any disclaimer, the term of this patent is extended or adjusted under 35 U.S.C. 154(b) by 0 days.

(21) Appl. No.: 14/510,233

(22) Filed: Oct. 9, 2014

Related U.S. Application Data

(60) Provisional application No. 61/888,724, filed on Oct. 9, 2013.

(51) Int. Cl.
*A01K 97/00* (2006.01)
*A01K 97/10* (2006.01)
*A01K 99/00* (2006.01)
*A47B 81/00* (2006.01)
*A01K 97/08* (2006.01)

(52) U.S. Cl.
CPC .............. *A01K 97/10* (2013.01); *A01K 99/00* (2013.01); *A47B 81/005* (2013.01); *A01K 97/08* (2013.01)

(58) Field of Classification Search
CPC ..... A01K 97/08; A01K 97/10; A47B 81/005; Y10S 224/922
USPC .............. 248/219.4, 230.8, 223.31, 518, 534, 248/499, 505, 520, 530, 538; 24/68 R, 16 R, 24/306; 43/21.2, 54.1, 35; 211/70.8; 224/922
See application file for complete search history.

(56) References Cited

U.S. PATENT DOCUMENTS

| | | | | |
|---|---|---|---|---|
| 3,947,927 A | * | 4/1976 | Rosenthal | 24/306 |
| 4,422,455 A | * | 12/1983 | Olsen | A61F 5/3761 128/878 |
| 5,136,759 A | * | 8/1992 | Armour, II | A44B 18/00 24/16 R |
| 5,395,018 A | * | 3/1995 | Studdiford | 24/68 R |
| 5,598,995 A | * | 2/1997 | Meuth et al. | 248/219.4 |
| 5,685,103 A | * | 11/1997 | Wiggins | 248/219.4 |
| 5,810,305 A | * | 9/1998 | Heard | G09F 7/18 248/218.4 |
| 6,345,418 B1 | * | 2/2002 | Bertrand et al. | 24/16 R |
| 6,431,315 B1 | * | 8/2002 | Lewis | A63B 27/00 182/136 |

* cited by examiner

*Primary Examiner* — Tan Le
(74) *Attorney, Agent, or Firm* — W. Edward Ramage; Baker Donelson

(57) ABSTRACT

An apparatus for securing a fishing pole or rod to a pier or other fixed object so that the fishing pole or rod can used without constantly being held. The head of the apparatus comprise a loop with a flat-bottomed spacer that can fit securely around a fishing pole or rod without interfering with the line. The head is attached by a quick-snap buckle to one end of an adjustable length strap, where the other end of the strap is fastened or connected to a pier railing, pole, post, cross-bar, or other fixed object or structure.

17 Claims, 2 Drawing Sheets

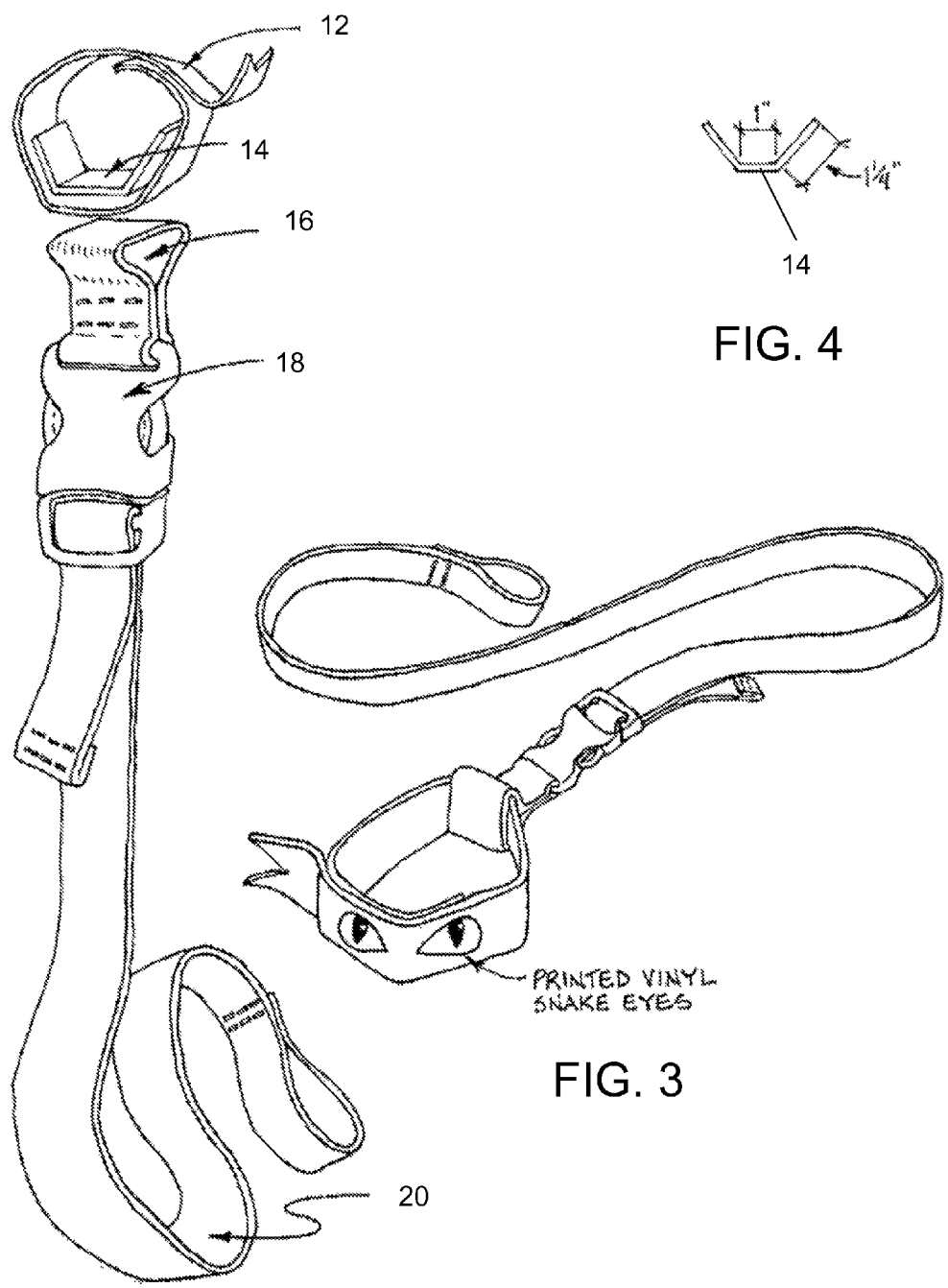

APPARATUS FOR SECURING FISHING POLE

This application claims benefit of and priority to U.S. Provisional Application No. 61/888,724, filed Oct. 9, 2013, by Ted Craddock, and is entitled to that filing date for priority. The specification, figures and complete disclosure of U.S. Provisional Application No. 61/888,724 are incorporated herein by specific reference for all purposes.

FIELD OF INVENTION

This invention relates to an apparatus for securing a fishing pole to a pier or other fixed object.

BACKGROUND OF THE INVENTION

Pier fishing is a popular form of fishing where the fisherman or woman uses one or more fishing poles or rods from a pier to catch fish. A variety of tackle, bait, and poles or rods may be used, including multiple pole systems. In many instances, the fisherman or woman will cast a line, and then prop the rod or pole against the pier railing rather than holding the rod or pole. Unsecured rods or poles, however, can easily fall over or be pulled into the water. Possible techniques for attempting to secure the rod or pole, such as using tape or rope, however, cause problems as the tape or rope interferes with the free run of the fishing line, takes too long to install after a cast is made, and takes too long to remove when a fish strikes the lure. Mechanical holders that are mounted (such as on a boat) also are known, but require mounting in a fixed location, which is usually not possible or not permitted on a pier, and also are limited to a particular location once mounted, thereby preventing the fisherman or woman from moving from place to place on the pier, or to another pier.

Accordingly, what is needed is a means to secure a pole or rod in place on a pier that can be quickly attached and quickly removed.

SUMMARY OF THE INVENTION

In various exemplary embodiments, the present invention comprises an apparatus for securing a fishing pole or rod to a pier or other fixed object so that the fishing pole or rod can used without constantly being held. The head of the apparatus comprise a loop with a flat-bottomed spacer that can fit securely around a fishing pole or rod without interfering with the line. The head is attached by a quick-snap buckle to one end of an adjustable length strap, where the other end of the strap is fastened or connected to a pier railing, pole, post, cross-bar, or other fixed object or structure.

DESCRIPTION OF THE DRAWINGS

FIG. 2 shows a perspective view of the apparatus.
FIG. 3 shows another perspective view of the apparatus.
FIG. 4 shows a side view of a flat-bottomed spacer.

DETAILED DESCRIPTION OF EXEMPLARY EMBODIMENTS

Figure 1:
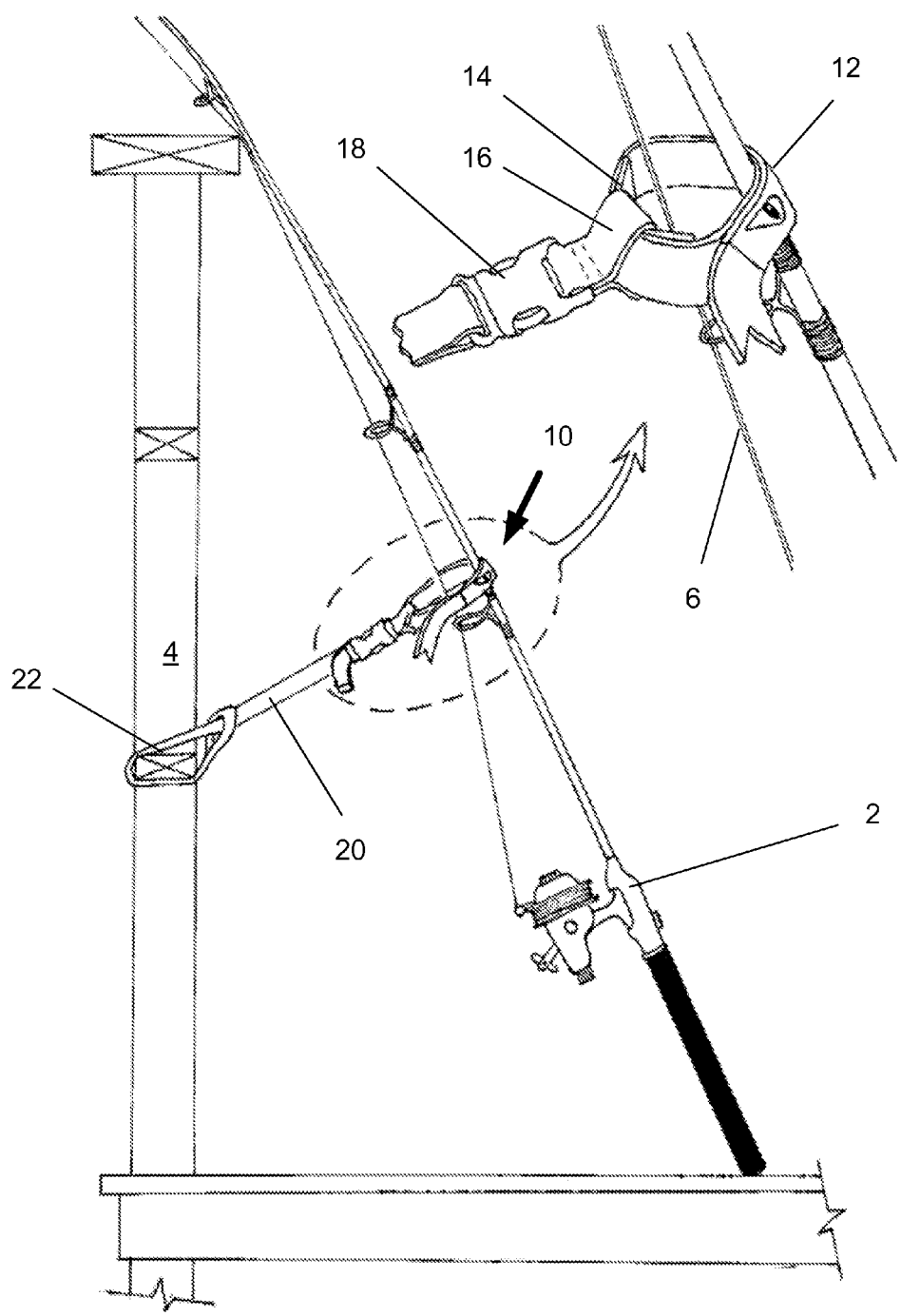
FIG. 1 shows a view of the apparatus in use with a fishing pole in accordance with an embodiment of the present invention.

In various exemplary embodiments, the present invention comprises an apparatus for securing a fishing pole 2 to a pier railing or post 4 or other fixed object so that the fishing pole can used without constantly being held.

In the embodiment shown in FIGS. 1-3, the head 10 of the apparatus comprises a loop 12 with a flat-bottomed spacer 14 affixed proximate the middle of the loop. The spacer also may be affixed at or near either end of the loop. The spacer 14 may be rigid or semi-rigid, and can receive and fit securely around a fishing pole 2 without interfering with the line 6. As seen in FIG. 4, in one embodiment, the spacer comprises a flat bottom with two sides extending upward at an angle. In alternative embodiments, the spacer may have other forms, such as (a) a flat bottom with two side extending upwards inwardly or at a right angle, (b) a V-shape, (c) a U-shape, (d) a curved bottom or continuous curve throughout.

In one embodiment, the head loop 12 comprises two ends that may be overlapped and fastened together via hook-and-look fasteners, snaps, buckles, or other similar quick-release fastening means. In an alternative embodiment, the head loop comprises a single strap with an end that fastens in the above-described manner to the other end of the strap at or near the spacer (i.e., where the spacer is affixed at or near one end of the loop). The head 10 is attached to one half of a quick-snap buckle, which may be a quick-release buckle with male and female components 18. In one embodiment, the head is attached to said buckle by a connector or strap 16. The other half of the buckle is attached to one end of a main strap 20, which may be an adjustable length strap. The opposite end of the main strap 20 is fastened or connected to a pier pole, cross-bar, or other structure by means of a wrap-around loop 22 or other similar means. The wrap-around loop may be openable in a manner similar to the head loop, or may be a fixed loop, in which case the loop is placed over the pier railing or post or other object, or the main strap is placed around the pier railing or post or other object, and the end with the buckle is inserted into and through the wrap-around loop.

To use the present invention, the user casts the line and places the pole against the top of the pier railing or cross-support or other fixed object in the desired position. The main strap is attached to the pier railing or cross-support or other fixed object by the means described above (e.g., wrapping the main strap around the object, and inserting the buckle end of the strap through the wrap-around loop and drawing it tight). The head loop is secured around the fishing pole, typically in a position just above an line guide on the pole so as not to interfere with the line. The head loop is buckled to the main strap (e.g., by inserting the half of the buckle on the head to the half of the buckle on the end of the main strap), and the length of the main strap is adjusted until the proper tension is reached. The tension holds the pole or rod in place, with the pole or rod pressing against the top of the head loop, thereby allowing the line to move freely in the space kept open by the width of the spacer. When a fish strikes, the user can quickly unfasten the pole from the strap, such as by pulling on the overlapping end of the head loop to release the hook-and-loop fasteners, snaps, or other quick-release fastening means.

In an alternative embodiment, the main strap may be directly affixed to the head, and the head loop may be integral with the main strap.

In several embodiments, the head or strap, or both, may be decorated. In the embodiment shown in FIG. 2, the head is decorated with a pair of printed vinyl snake eyes, and the end of the outermost end of the head loop has the form (and possibly color) of a snake's tongue. Any form of decoration or images or colors, or combinations thereof, may be used for any part of the invention.

In one exemplary embodiment, the head loop is 0.75 inches wide and 16.0 inches long, black in color with a red plastic at the end (i.e., the tongue). The head loop may be black webbing or similar material. The spacer is 0.75 inches wide, while the bottom is 1.0 inch long, with two angle arms each 1.25 inches long. The spacer may be formed of polyethylene and covered in black plastic. The buckle is a 1 inch two-part (male half, female half) quick-release plastic buckle releasable with side pressure. The strap is 1.0 inch wide and 35.0 inches long, formed from black webbing and with a formed end loop.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An apparatus for fishing, comprising:
   a fishing pole with a first side and a second side opposite said first side, with a fishing line extending along said first side, said fishing pole in angled contact with a railing or horizontal support at a first point of contact, and with a floorboard or ground at a second point of contact;
   a head strap with a length and a width, and with a first end and a second end, with a rigid or semi-rigid spacer with a length and a width affixed therebetween contiguous with the head strap, said spacer comprising a bottom and two ends extending upwards from the bottom at an outward angle, said head strap first end overlapping said head strap second end so that said head strap first end or area of the head strap proximate to said first end is fastened to or near the head strap second end by quick-release fastening means to form a head loop of sufficient circumference to maintain tension contact with the second side of said fishing pole at a third point of contact without touching said fishing line, wherein said spacer is not in contact with said fishing pole or said fishing line; and
   a main strap with a first end and second end, the first end of the main strap fastened with a connector or connection strap to the head strap in the area where the spacer is affixed to the head strap, and the second end comprising means for securely fastening the main strap to a component of a pier or other fixed object.

2. The apparatus of claim 1, wherein the spacer width is equal to or less than the width of the head strap, and comprises a flat bottom with the two angled ends of equal length.

3. The apparatus of claim 1, wherein the head loop has an interior side and an exterior side, wherein the spacer is affixed to the interior side of the head loop.

4. The apparatus of claim 1, wherein the quick-release fastening means comprises hook-and-loop fasteners.

5. The apparatus of claim 1, wherein the quick-release fastening means comprises a snap fastener.

6. The apparatus of claim 1, wherein the main strap is adjustable in length.

7. The apparatus of claim 1, wherein the main strap second end means for securely fastening comprises an end loop.

8. The apparatus of claim 7, wherein the end loop is fixed.

9. The apparatus of claim 1, wherein the first end of the main strap is fastened to the connector or connection strap by a buckle.

10. The apparatus of claim 9, wherein the buckle is a quick-snap buckle with a male half and a female half.

11. The apparatus of claim 10, wherein one half of the buckle is fastened to the first end of the main strap, and the other half of the buckle is fastened to the connector or connection strap.

12. The apparatus of claim 11, wherein the head strap is fastened to the other half of the buckle by said connector or connection strap.

13. The apparatus of claim 1, wherein the quick-release fastening means is adapted to quickly detach the head strap first end from the head strap second end without any part of the head strap contacting or interfering with the fishing line.

14. The apparatus of claim 1, wherein first end of the head strap extends beyond the quick-release fastening means.

15. The apparatus of claim 2, wherein the spacer is rigid, the spacer bottom is approximately one inch in length, and the two angled ends are approximately one and one-quarter inches in length.

16. The apparatus of claim 1, wherein the head loop does not pass through any openings or slots in the spacer.

17. The apparatus of claim 1, wherein the third point of contact is between the first point of contact and the second point of contact.

* * * * *